United States Patent
Veeningen et al.

(10) Patent No.: US 11,818,249 B2
(45) Date of Patent: Nov. 14, 2023

(54) NODES AND METHODS OF OPERATING THE SAME

(71) Applicant: KONINKLIJKE PHILIPS N.V., Eindhoven (NL)

(72) Inventors: Meilof Geert Veeningen, Eindhoven (NL); Peter Petrus Van Liesdonk, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 406 days.

(21) Appl. No.: 16/757,549

(22) PCT Filed: Nov. 28, 2018

(86) PCT No.: PCT/EP2018/082762
§ 371 (c)(1),
(2) Date: Apr. 20, 2020

(87) PCT Pub. No.: WO2019/110380
PCT Pub. Date: Jun. 13, 2019

(65) Prior Publication Data
US 2021/0203484 A1    Jul. 1, 2021

Related U.S. Application Data (60) Provisional application No. 62/594,322, filed on Dec. 4, 2017.

(51) Int. Cl.
*H04L 9/08* (2006.01)

(52) U.S. Cl.
CPC .......... *H04L 9/08* (2013.01); *H04L 2209/04* (2013.01); *H04L 2209/46* (2013.01); *H04L 2209/50* (2013.01)

(58) Field of Classification Search
CPC ... H04L 9/08; H04L 2209/04; H04L 2209/46; H04L 2209/50; H04L 2209/12;
(Continued)

(56) References Cited

U.S. PATENT DOCUMENTS 7,133,525 B1 * 11/2006 DeGregorio ......... H04N 1/4406
380/244
7,240,198 B1 * 7/2007 Pinkas .................... H04L 9/321
713/168
(Continued)

OTHER PUBLICATIONS

Valeria Nikolaenko et al., Privacy-Preserving Ridge Regression on Hundreds of Millions of Records, IEEE, 2012.*
(Continued)

*Primary Examiner* — David Garcia Cervetti (57) ABSTRACT

Various embodiments include a first node for providing a function to a second node for evaluation, the first node configured to form a first plurality of garbled circuits for the function, each circuit being formed from a circuit representing the function and a respective set of wire keys and including one or more logic operations, one or more input wires for inputting data into the circuit and one or more output wires for outputting the result of the function, wherein each respective set of wire keys comprises a respective subset of wire keys for each input wire and each output wire, each subset of wire keys comprising a plurality of wire keys, each wire key in the plurality being associated with a possible value for the wire; and publish a first list of the first plurality of garbled circuits for the function for access by a plurality of second nodes.

21 Claims, 3 Drawing Sheets

(58) Field of Classification Search
CPC ..... H04L 9/0662; H04L 9/008; H04L 9/3218; H04L 63/065; H04L 9/0861
See application file for complete search history.

(56) References Cited

U.S. PATENT DOCUMENTS

| | | | | |
|---|---|---|---|---|
| 8,762,736 | B1* | 6/2014 | Goldwasser | G06F 21/556 235/382 |
| 8,881,295 | B2* | 11/2014 | Kolesnikov | H04L 9/0662 713/171 |
| 9,055,038 | B1* | 6/2015 | Lu | H04L 9/08 |
| 9,077,539 | B2* | 7/2015 | Kamara | H04L 9/0816 |
| 9,124,417 | B2* | 9/2015 | Kolesnikov | H04L 9/06 |
| 9,350,731 | B2* | 5/2016 | Patey | H04L 9/3231 |
| 9,729,525 | B1* | 8/2017 | Kolman | G06F 16/951 |
| 9,906,511 | B1* | 2/2018 | Kolman | H04L 9/3242 |
| 9,917,820 | B1* | 3/2018 | Kolman | H04L 63/0428 |
| 11,551,035 | B2* | 1/2023 | Schneider | G06F 18/2148 |
| 2006/0245587 | A1* | 11/2006 | Pinkas | H04L 9/085 380/28 |
| 2009/0187757 | A1* | 7/2009 | Kerschbaum | H04L 9/3271 713/153 |
| 2011/0110525 | A1* | 5/2011 | Gentry | H04L 9/0822 380/285 |
| 2011/0211692 | A1* | 9/2011 | Raykova | H04L 9/008 380/46 |
| 2011/0216902 | A1* | 9/2011 | Kolesnikov | H04L 9/0662 380/47 |
| 2012/0070000 | A1* | 3/2012 | Baechler | H04L 9/3218 380/255 |
| 2012/0079602 | A1* | 3/2012 | Kolesnikov | H04L 9/14 726/26 |
| 2012/0213359 | A1* | 8/2012 | Troncoso Pastoriza | H04L 9/008 380/28 |
| 2012/0233460 | A1* | 9/2012 | Kamara | H04L 9/3218 713/168 |
| 2014/0040614 | A1* | 2/2014 | Kolesnikov | G06F 21/6245 713/164 |
| 2014/0093077 | A1* | 4/2014 | Jawurek | H04L 63/123 380/268 |
| 2014/0095861 | A1* | 4/2014 | Kolesnikov | H04L 9/32 713/151 |
| 2014/0105393 | A1* | 4/2014 | Kolesnikov | H04L 9/3218 380/255 |
| 2014/0143764 | A1* | 5/2014 | Kerschbaum | G06F 8/437 717/143 |
| 2014/0289536 | A1* | 9/2014 | MacCarthy | G06F 21/6245 713/189 |
| 2014/0372769 | A1* | 12/2014 | Kerschbaum | H04L 9/008 713/189 |
| 2015/0007258 | A1* | 1/2015 | Patey | G06V 40/10 726/1 |
| 2015/0089243 | A1* | 3/2015 | Veugen | H04L 9/008 713/190 |
| 2015/0341326 | A1* | 11/2015 | Premnath | H04L 9/3218 713/171 |
| 2015/0381349 | A1* | 12/2015 | Nikolaenko | G06F 21/602 713/189 |
| 2016/0004874 | A1* | 1/2016 | Ioannidis | H04L 9/302 713/165 |
| 2016/0044031 | A1* | 2/2016 | Kolesnikov | H04L 63/0876 713/170 |
| 2016/0196436 | A1* | 7/2016 | Kennedy | H04L 9/3221 713/189 |
| 2016/0205095 | A1* | 7/2016 | Morel | H04L 9/3231 726/6 |
| 2017/0005787 | A1* | 1/2017 | Weaver | G16B 50/40 |
| 2017/0163421 | A1* | 6/2017 | Chase | H04L 9/3242 |
| 2017/0359321 | A1* | 12/2017 | Rindal | G06F 21/602 |
| 2018/0019868 | A1* | 1/2018 | Pe'Er | H04L 63/061 |
| 2018/0019997 | A1* | 1/2018 | Chabanne | H04L 63/0861 |
| 2018/0145827 | A1* | 5/2018 | Pitel | H04L 63/0428 |
| 2018/0204284 | A1* | 7/2018 | Cerezo Sanchez | G06Q 40/06 |
| 2018/0240100 | A1* | 8/2018 | Leleu | G06Q 20/4012 |
| 2018/0276417 | A1* | 9/2018 | Cerezo Sanchez | G06F 21/72 |
| 2018/0359082 | A1* | 12/2018 | Bos | H04L 9/0631 |
| 2019/0065759 | A1* | 2/2019 | Pitel | H04L 9/00 |
| 2019/0116048 | A1* | 4/2019 | Chen | H04W 4/48 |
| 2019/0116180 | A1* | 4/2019 | Teranishi | H04L 9/3234 |
| 2019/0258829 | A1* | 8/2019 | Pitel | G06F 21/30 |
| 2019/0386814 | A1* | 12/2019 | Ahmed | H04L 9/008 |
| 2020/0186352 | A1* | 6/2020 | Arora | H04L 9/3231 |
| 2020/0202038 | A1* | 6/2020 | Zhang | G16B 20/20 |
| 2020/0242466 | A1* | 7/2020 | Mohassel | H04L 9/008 |
| 2020/0259651 | A1* | 8/2020 | Mohassel | H04L 9/0618 |
| 2020/0304293 | A1* | 9/2020 | Gama | G06F 17/16 |
| 2020/0389304 | A1* | 12/2020 | Gryb | H04L 9/0894 |
| 2021/0157937 | A1* | 5/2021 | Van Liesdonk | H04L 63/0428 |
| 2022/0092216 | A1* | 3/2022 | Mohassel | G06N 3/084 |

OTHER PUBLICATIONS

Malkhi, D. et al., "Fairplay—secure two-party computation system". Proceedings of the 13th USENIX Security Symposium, Aug. 9-13, 2004, San Diego, CA, pp. 287-302.
Carter, H. et al., "Secure Outsourced Garbled Circuit Evaluation for Mobile Devices", Proceedings of the 22nd USENIX Security Symposium Aug. 14-16, 2013, Washington, D.C.
Frederiksen, T.K., "The Hitchhiker's Guide to Garbled Circuits Garbled Circuits and Their Applications to Maliciously Secure Two-Party Protocols". Nov. 11, 2015, PhD Dissertation, Department of Computer Science, Aarhus University, Denmark.
Carter, H.L., "Efficient Techniques for Secure Multiparty Computation on Mobile Devices", Dissertation, Georgia Institute of Technology, Dec. 1, 2015.
International Search Report for PCT/EP2018/082762 dated Nov. 28, 2018.
Bellare, M. et al., "Efficient garbling from a fixed-key blockcipher". Cryptology ePrint Archive, Report 2013/426, 2013. http://eprint.iacr.org/.
Chou, T. et al., "The simplest protocol for oblivious transfer." Cryptology ePrint Archive, Report 2015/267, 2015. http://eprint.iacr.org/.
Kennedy, W.S. et al., "Overlaying circuit clauses for secure computation." IACR Cryptology ePrint Archive, 2016:685, 2016.
Kiss, A. et al., "Valiant's universal circuit is practical." In Proceedings EUROCRYPT 2016, pp. 699-728, 2016.
Lindell, Y. et al., "An efficient protocol for secure two-party computation in the presence of malicious adversaries." Cryptology ePrint Archive, Report 2008/049, 2008. http://eprint.iacr.org/2008/049.
Lindell, Y. et al., "A proof of security of Yao's Protocol for Two-Party Computation." J. Cryptology, 22(2): 161-188, 2009.
Mohassel, P. et al., "Efficiency Tradeoffs for Malicious Two-Party Computation." in Public Key Cryptography—PKC 006, 9th International Conference on Theory and Practice of Public-Key Cryptography, New York, Apr. 24-26, 2006, Proceedings, pp. 458-473, 2006.

* cited by examiner

NODES AND METHODS OF OPERATING THE SAME

CROSS-REFERENCE TO PRIOR APPLICATIONS

This application is the U.S. National Phase application under 35 U.S.C. § 371 of International Application No. PCT/EP2018/082762, filed on Nov. 28, 2018, which claims the benefit of U.S. Patent Application No. 62/594,322, filed on Dec. 4, 2017. These applications are hereby incorporated by reference herein.

FIELD

This disclosure relates to the provision of a function to client nodes for evaluation, and the evaluation of functions by client nodes.

BACKGROUND

Using a combination of multi-party computation techniques, it is possible for party A (e.g. a server) to allow one-time use of an algorithm to party B (e.g. a client node), without party B learning any information about the internals of the algorithm. Specifically, using a technique called garbled circuits, party A can encrypt a (binary) circuit of a computation gate-by-gate such that it can be evaluated once by party B under encryption. Although this reveals the topology of the circuit to party B, techniques are known to design circuit topologies that can represent multiple known functions or any function of a known size (at a performance penalty).

In order to evaluate a garbled circuit on a particular input, the party B needs to obtain the so-called "wire keys" corresponding to his sensitive (secret) inputs from party A. Specifically, for each input bit b, party A has generated keys $k_0$ and $k_1$ (representing input bits 0 and 1 respectively) and party B needs to obtain $k_b$. To protect the secrecy of the circuit, party A cannot give both $k_0$ and $k_1$ to party B, but to protect the secrecy of the input, party A cannot know whether party B has requested $k_0$ or $k_1$. To still allow the wire key to be transferred, a cryptographic technique called "oblivious transfer" (OT) can be used in which party B learns exactly one key and party A does not know which one.

Typically, garbled circuits are applied in the setting where party A's algorithm is not secret (and for example the algorithm is known to party B) and, like party B, party A has sensitive data. In this setting, it is desirable for party B evaluating the circuit to know that party A actually encrypted the correct (i.e. known) algorithm. One technique to achieve this is referred to as "cut-and-choose". In a simple variant of this technique, as described in "Fairplay—secure two-party computation system" by D. Malkhi et al. (Proceedings of the 13th USENIX Security Symposium, Aug. 9-13, 2004, San Diego, Calif., USA, pages 287-302, 2004), party A provides D garbled circuits to party B, of which party B chooses one at random. The one chosen garbled circuit is evaluated by party B, while for the other D−1 garbled circuits, party A shows party B how it encrypted (garbled) the circuit, hence proving that it is a correct encryption (garbling) of the algorithm. If the other D−1 circuits are correct, then because party B chose one at random, the probability of the chosen circuit being correct is at least (D−1)/D. A subtlety, however, is that as part of the evaluation, party B has to obtain wire keys $k_0$ and $k_1$ for its sensitive data input via OT from party A; at this point party A still has the opportunity to swap the wire keys and hence manipulate party B's input. To prevent this, party A can provide so-called "commitments" for the wire keys sent to party B (where a commitment in this example is a secret statement by party A as to the wire key representing a particular bit value) and as part of the OT party B both receives the appropriate wire key, and a so-called "witness" for verifying its commitment (where the witness enables party B to check the statement conveyed by the commitment, i.e. in this case the wire key represented by the particular bit-value). Alternatively, it is possible to use cryptographic hashes or digital signatures instead of commitments and witnesses, in which case no witness is needed for verification. In another variant of the "cut-and-choose" technique, instead of evaluating one of the D circuits, party B evaluates F out of D circuits and opens the remaining D-F to check that party A garbled the correct algorithm. Party B will only accept the computation results if all D-F opened circuits are correct and all F evaluated circuits return the same result. When done right this reduces the probability of an incorrect computation result being accepted to being exponentially small in D. It will be appreciated that in this case party B needs to obtains the wire keys for all F garbled circuits within one OT to prevent party B from being able to evaluate the circuit F times on different inputs.

SUMMARY

Thus, the above techniques for enabling a party to verify that another party has garbled the correct algorithm are applied in the setting where both parties have sensitive data (i.e. secret inputs) and the algorithm is known to both parties.

However, there are scenarios in which party A has a proprietary algorithm that they want to enable party B to run on their (party B's) sensitive data. In this case party B should not learn the algorithm and party A should not learn the sensitive data belonging to party B. For instance, an insurance company might want to offer a quote for insurance to a potential customer, but the insurance company does not want to disclose the formula to produce the quote, and the potential customer does not want to disclose the information needed to produce the quote (for example in case he rejects the offer).

Therefore, party A has a proprietary algorithm that it wants to keep secret but "lease" to multiple customers (client nodes), in the sense of enabling them to execute the algorithm once on data of their choice. Here, the solutions that use a combination of multi-party computation techniques do not prevent party A from changing or adapting the algorithm to a particular customer, or changing the algorithm over time. That is, because the algorithm that party A provides to his customers is encrypted (garbled), party A can choose to supply a different algorithm for each execution. In some settings this needs to be prevented. For instance, in the insurance quote example above, customers want to know that they receive an algorithm that actually computes their insurance quote based on their (secret) provided information, not an algorithm that also uses secondary information the insurance company is not supposed to use. Customers also want to know that the insurance company is fair and computes the quote in the same way for every customer.

The techniques described herein provide that a first node (e.g. a server) forms a number of garbled circuits that are available for client nodes to use to input their secret information, and the first node publishes a list of these garbled circuits for all client nodes to select from. In this way the first node is forced or required to provide the same algorithm to its different customers, and, in some embodiments, this is extended to ensure that the first node continues this over time. These techniques provide assurance to the client nodes that the encrypted (garbled) circuit has been produced beforehand, independently of the identity of the client node that evaluates it. This prevents the discrimination problem outlined above.

According to a first specific aspect, there is provided a first node for providing a function to a second node for evaluation, the first node being configured to form a first plurality of garbled circuits for the function, each garbled circuit being formed from a circuit representing the function and a respective set of wire keys, the circuit including one or more logic operations, one or more input wires for inputting input data into the circuit and one or more output wires for outputting the result of the function, wherein each respective set of wire keys includes a respective subset of wire keys for each input wire and each output wire, each subset of wire keys including a plurality of wire keys, each wire key in the plurality being associated with a possible value for the respective wire; and publish a first list of the first plurality of garbled circuits for the function for access by a plurality of second nodes.

According to a second aspect, there is provided a method of operating a first node to provide a function to a second node for evaluation, the method including forming a first plurality of garbled circuits for the function, each garbled circuit being formed from a circuit representing the function and a respective set of wire keys, the circuit including one or more logic operations, one or more input wires for inputting input data into the circuit and one or more output wires for outputting the result of the function, wherein each respective set of wire keys includes a respective subset of wire keys for each input wire and each output wire, each subset of wire keys including a plurality of wire keys, each wire key in the plurality being associated with a possible value for the respective wire; and publishing a first list of the first plurality of garbled circuits for the function for access by a plurality of second nodes.

According to a third aspect, there is provided a computer program product including a computer readable medium having computer readable code embodied therein, the computer readable code being configured such that, on execution by a suitable computer or processor, the computer or processor is caused to perform the method according to the second aspect of any embodiment thereof.

According to a fourth aspect, there is provided a second node for evaluating a function using a input data of the second node, the second node being configured to receive a first list of a first plurality of garbled circuits for the function from a first node, wherein each garbled circuit is formed from a circuit including one or more logic operations representing the function and a respective set of wire keys, the circuit having one or more input wires for inputting a input data into the circuit and one or more output wires for outputting the result of the function, each respective set of wire keys including a respective subset of wire keys for each input wire and each output wire, each subset of wire keys including a plurality of wire keys, each wire key in the plurality being associated with a possible value for the respective wire; receive a second list indicating which one or ones of the first plurality of garbled circuits for the function have been evaluated; obtain one or more of the garbled circuits that are in the first list but not in the received second list from the first node; and evaluate the obtained one or more garbled circuits using the input data of the second node to determine the output of the function.

According to a fifth aspect, there is provided a method of operating a second node to evaluate a function using a input data of the second node, the method including receiving a first list of a first plurality of garbled circuits for the function from a first node, wherein each garbled circuit is formed from a circuit including one or more logic operations representing the function and a respective set of wire keys, the circuit having one or more input wires for inputting a input data into the circuit and one or more output wires for outputting the result of the function, each respective set of wire keys including a respective subset of wire keys for each input wire and each output wire, each subset of wire keys including a plurality of wire keys, each wire key in the plurality being associated with a possible value for the respective wire; receiving a second list indicating which one or ones of the first plurality of garbled circuits for the function have been evaluated; obtaining one or more of the garbled circuits that are in the first list but not in the received second list from the first node; and evaluating the obtained one or more garbled circuits using the input data of the second node to determine the output of the function.

According to a sixth aspect, there is provided a computer program product including a computer readable medium having computer readable code embodied therein, the computer readable code being configured such that, on execution by a suitable computer or processor, the computer or processor is caused to perform the method according to the fifth aspect of any embodiment thereof.

According to a seventh aspect, there is provided a system, including a first node according to the first aspect or any embodiment thereof, and one or more second nodes according to the fourth aspect or any embodiment thereof.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION

Figure 1:
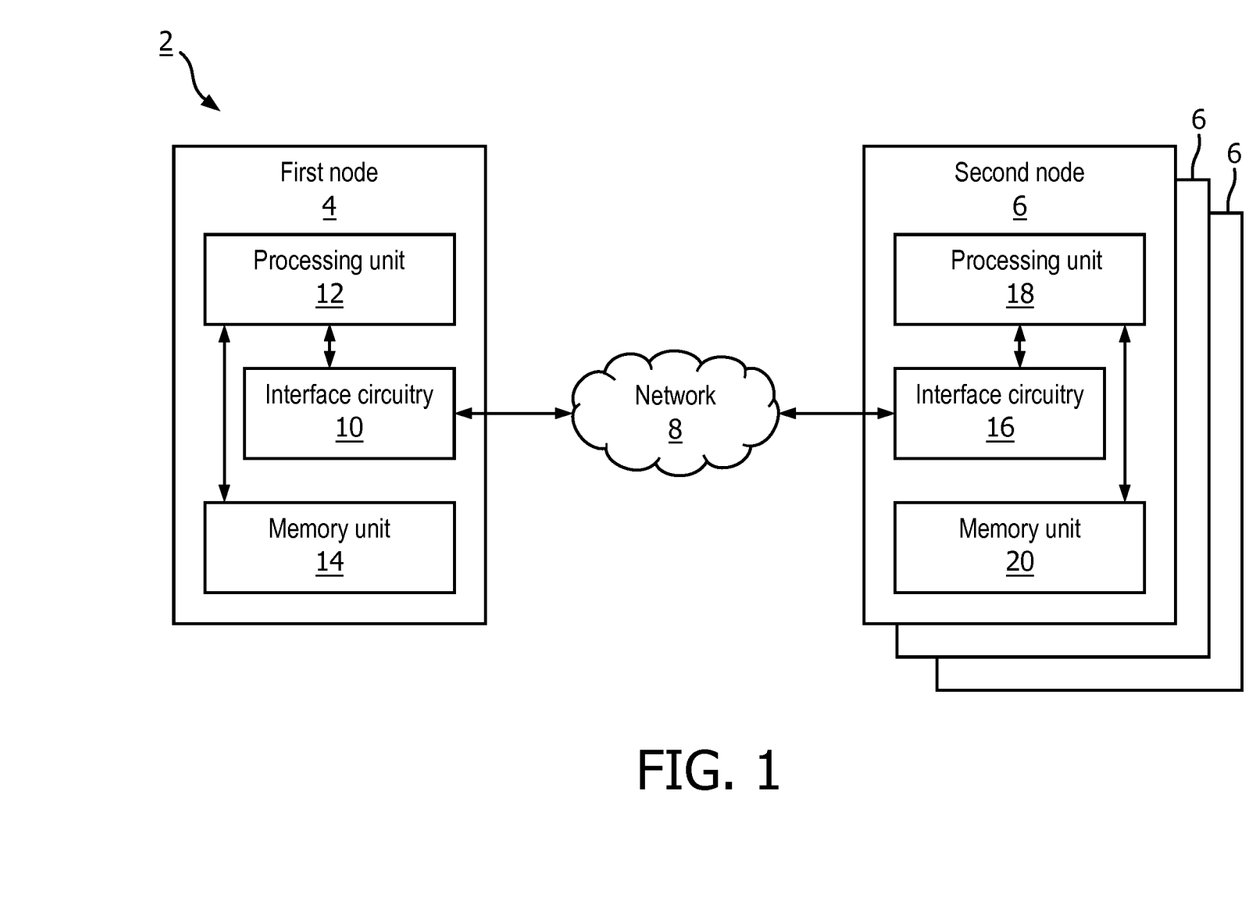
FIG. 1 is a block diagram of a system including a server and a plurality of client nodes.

FIG. 1 is a block diagram of a system 2 in which the techniques and principles described herein may be implemented. The system 2 includes a first node 4, which is variously referred to herein as a server 4, and one or more second nodes 6, which are referred to herein as client nodes 6. In accordance with the teachings herein, the first node 4 is the node that has an algorithm (function) that other parties (e.g. the client nodes 6) would like to use to evaluate their data. Thus, the second nodes 6 are nodes that have sensitive/secret data that they do not wish to share with the first node 4, the other second nodes 6 and/or any other node or party. As an example, the algorithm function can be for calculating an insurance premium, and the secret data for a second node 6 can be the personal details of a user of the second node 6. In another example, a company could develop a proprietary model to determine whether a patient falls in a particular risk category, and the company does not want to disclose the model or the attributes that are used for the model.

Although FIG. 1 shows three second nodes 6, it will be appreciated that a system 2 can include more or less than three second nodes 6. It will be appreciated that the first node 4 can take forms other than a server, for example the first node 4 can be, or be part of, any type of electronic or computing device, such as a computer, a laptop, a tablet, a smartphone, etc. Each client node 6 can be, or be part of, any type of electronic device or computing device, such as a server, a computer, a laptop, a tablet, a smartphone, etc.

The first node 4 and second nodes 6 are interconnected via a network 8, such as the Internet, and thus may be located at respectively different locations. Of course, it will be appreciated that one or more of the second nodes 6 may be local to the first node 4, and interconnected via a wired or wireless connection.

The first node 4 includes interface circuitry 10 for enabling a data connection to and/or data exchange with other devices, such as the second nodes 6. In particular the interface circuitry 10 can enable a connection between the first node 4 and the network 8, such as the Internet, via any desirable wired or wireless communication protocol. For example, the interface circuitry 10 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). The first node 4 further includes a processing unit 12 for performing operations on data and for generally controlling the operation of the first node 4. The interface circuitry 10 may be connected to the processing unit 12. The first node 4 further includes a memory unit 14 for storing any data required for the execution of the techniques described herein and for storing computer program code for causing the processing unit 12 to perform method steps as described in more detail below. The memory unit 14 may be connected to the processing unit 12.

The processing unit 12 can be implemented in numerous ways, with software and/or hardware, to perform the various functions described herein. The processing unit 12 may include one or more microprocessors or digital signal processor (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 14 can include any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

Each second node 6 includes interface circuitry 16 for enabling a data connection to other devices, such as the first node 4. In particular the interface circuitry 16 can enable a connection between the second node 6 and the network 8, such as the Internet, via any desired wired or wireless communication protocol (including the exemplary protocols listed above in respect of the interface circuitry 10). The second node 6 further includes a processing unit 18 for performing operations on data and for generally controlling the operation of the second node 6. The second node 6 further includes a memory unit 20 for storing any data required for the execution of the techniques described herein and for storing computer program code for causing the processing unit 18 to perform method steps as described in more detail below.

The processing unit 18 and memory unit 20 can be implemented in numerous ways, similar to the processing unit 12 and memory unit 14 in the first node 4.

It will be appreciated that a practical implementation of a first node 4 and/or second node 6 may include additional components to those shown in FIG. 1. For example either or both of the first node 4 and second node 6 can include a power supply, such as a battery, or components for enabling the first node 4 and/or second node 6 to be connected to a mains power supply. As another example, the first node 4 and/or second node 6 can include a user interface that includes one or more components that enables a user of the first node 4 and/or second node 6 to input information, data and/or commands into the first node 4 and/or second node 6 (as appropriate), and/or enables the first node 4 and/or second node 6 to output information or data to the user of the first node 4 and/or second node 6. The user interface can include any suitable input component(s), including but not limited to a keyboard, keypad, one or more buttons, switches or dials, a mouse, a track pad, a touchscreen, a stylus, a camera, a microphone, etc., and the user interface can include any suitable output component(s), including but not limited to a display screen, one or more lights or light elements, one or more loudspeakers, a vibrating element, etc.

Briefly, the techniques described herein provide that a first node 4 is discouraged from adapting their encrypted (garbled) circuit representing a function to be evaluated for a particular second node 6 by requiring the first node 4 to publish many encrypted circuits for the function, and allowing the second node 6 to select one of them to evaluate. The second node 6 can select the garbled circuit randomly out of the list of garbled circuits that has been published by the first node 4, and the first node 4 now does not have the chance to adapt the garbled circuit for the second node 6.

In some embodiments, to further reduce the probability that the second node 6 selected a "special" garbled circuit (e.g. a circuit where the first node 4 has modified or adapted the function for that second node 6 or for some other reason), the second node 6 can select multiple garbled circuits and check that they all provide the same result. In some embodiments, for example where the second node 6 has previously evaluated other input data with the algorithm, the second node 6 can execute the garbled circuit using their other input data to check that the output matches the previous evaluation, before inputting the new data into the garbled circuit. In other embodiments, the first node 4 can refresh the published list of garbled circuits over time, for example at certain (e.g. fixed) time intervals and/or when a certain number of garbled circuits have been evaluated, but the first node 4 should keep the garbled circuits from the previous lists/previous time interval available. The second node 6 can evaluate garbled circuits from both lists/time intervals and compare the outputs. In the event of manipulation of the function by the first node 4 (i.e. if different outputs are obtained for the different garbled circuits), then some second nodes 6 will complain, which discourages the first node 4 from changing the underlying function.

It will be appreciated that the above techniques differ from the cut-and-choose technique described above in that no garbled circuits are opened to check that the first node 4 encrypted the circuit correctly (since the circuit is secret to the first node 4), which means that the techniques described herein perform a subset of the steps of cut-and-choose to achieve a restricted purpose, namely checking that different instances of an algorithm are the same instead of also checking that they adhere to a specification. In addition, in cut-and-choose, D encrypted (garbled) circuits are built for a single evaluation of the function, and they are not re-used between executions, whereas the techniques described herein provide for the publishing of a common 'pool' of garbled circuits that multiple second nodes 6 all select from. In this case, since it is important for the secrecy of the encrypted function that each garbled circuit is evaluated only once, the first node 4 can publish a list of garbled circuits that have already been used and second nodes 6 can select an unused one of the garbled circuits to evaluate.

Figure 2:
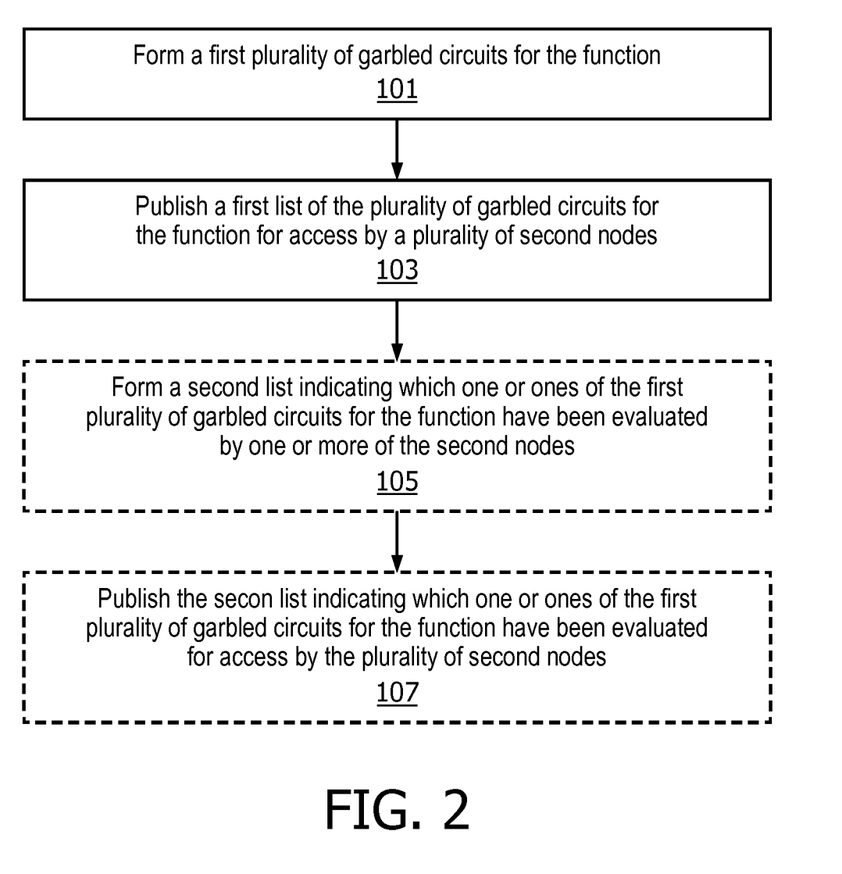
FIG. 2 is a flow chart illustrating an exemplary method of operating a first node according to an embodiment.
Figure 3:
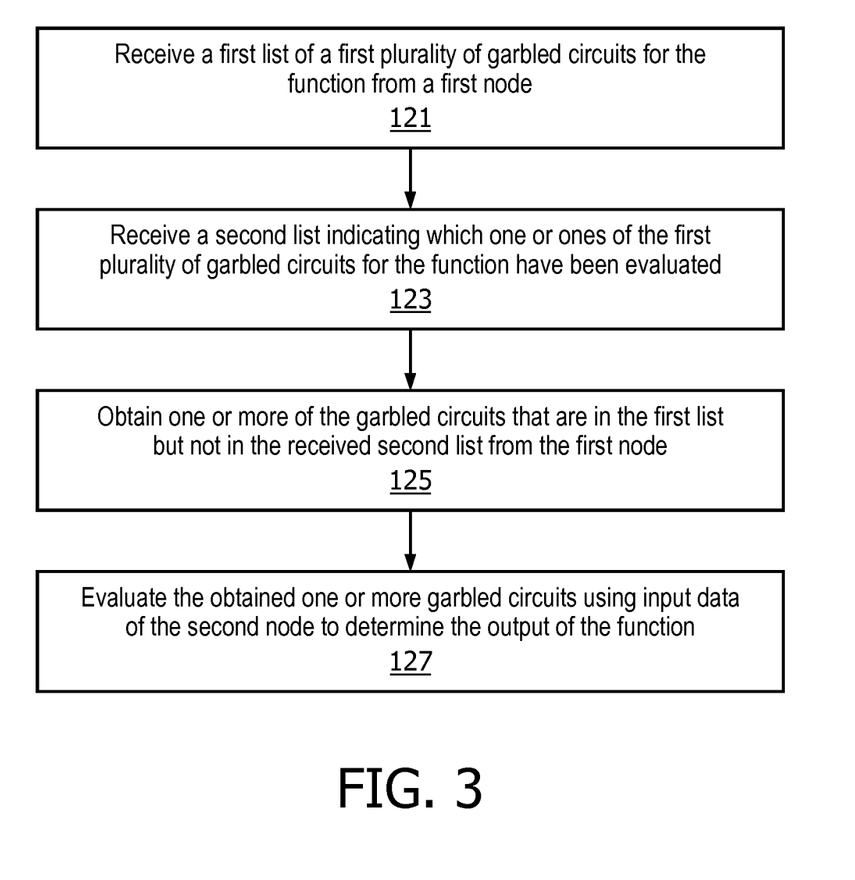
FIG. 3 is a flow chart illustrating an exemplary method of operating a client node according to an embodiment.

Various embodiments of the techniques presented herein are described below with reference to the flow charts in FIG. 2 and FIG. 3. FIG. 2 illustrates a method of operating a first node 4 (e.g. a server) according to various embodiments, and FIG. 3 illustrates a method of operating a second node 6 (e.g. a client node) according to various embodiments. It will be appreciated that the method in FIG. 2 can be performed by processing unit 12 in conjunction with interface circuitry 10, and the method in FIG. 3 can be performed by processing unit 18 in conjunction with interface circuitry 16. As noted above, the first node 4 has a function that is proprietary or that is otherwise to be kept secret from other parties, including the second nodes 6. A second node 6 has input data that is to be evaluated using the function to provide output data.

The method starts in step 101 of FIG. 2 with the first node 4 forming a first plurality of garbled circuits representing the function. Each garbled circuit is denoted $C_i$. The function can be represented by one or more logic operations, such as Boolean logic operations and operations such as adding, subtracting, multiplying, dividing, etc. A circuit representing the function can include one or more logic gates (e.g. AND, OR, NOT, etc.) and/or combinations thereof. A circuit will have one or more input wires for enabling information that is to be input to the function, which includes at least the input data, to be input to the circuit. The circuit also has one or more output wires for enabling the information that is generated by the function to be output from the circuit. Each input wire is for inputting a single bit into the circuit (so a binary 1 or 0). Likewise, each wire in the one or more output wires is for outputting a single bit from the circuit (so a binary 1 or 0).

When a circuit is garbled by the first node 4, the first node 4 generates a respective pair of wire keys for each input wire and each output wire (and indeed for any intermediate wires within the circuit, e.g. that link the logic operations in the circuit together), with one of the wire keys in each pair representing a '0' bit on that wire and the other one of the wire keys in each pair representing a '1' bit on that wire. A wire key is typically a randomly generated string of bits (e.g. a wire key can replace a binary '0' or '1' with a random bit string, e.g. including 128 bits). Then, all of the '0's and '1's in the truth tables for the logic operation(s) in the circuit are replaced with the appropriate wire key for that wire and bit value. Each output value in each truth table is then encrypted using the wire keys for the inputs that provide that value. For example for two input wires G and H and an output wire Z, a '0' output for wire Z that is produced by a '1' input on wire G and a '0' input on wire H will be represented by $\text{Enc}_{X_G^1 X_H^0}(X_Z^0)$, where $X_Y^x$ is the wire key for wire Y and bit value x. The encrypted outputs in the truth tables are then randomly permuted to generate a 'garbled table'. In some embodiments, the first node 4 can generate commitments and corresponding witnesses for each of the wire keys so that the first node 4 can subsequently prove to a second node 6 that it did not manipulate the wire keys after garbling. For example commitments $c_0$ and $c_1$ and witnesses $w_0$ and $w_1$ can be generated for wire keys $k_0$ and $k_1$ respectively. In alternative embodiments, the first node 4 can generate hashes of each of the wire keys or digital signatures, and the hashes or digital signatures can be used instead of commitments.

As an alternative to the above, it will be appreciated that the circuit may have one or more wires (input and/or output) that can represent or have any number of values, i.e. not just a 0-bit and/or a 1-bit, but a range of values or a set of values (and specifically more than two possible values). In this case, a respective wire key is generated for each possible value of each input wire and each output wire. Thus, each wire (input and output) has an associated subset of wire keys, with each wire key in the subset representing a possible value for the wire. For simplicity, in the following description of the techniques presented herein, the input wire(s) and output wire(s) of the circuit are assumed to only have or only use 0-bit and 1-bit values, but it will be appreciated that all the following techniques can also be applied to circuits for which the input wire(s) and/or output wire(s) can have different (and/or more) values. In embodiments where each wire can represent any number of values, wire keys for a particular wire can be generated from a first wire key, e.g. k0, and an offset value J, with the wire key for value i being generated from, for example, k0+i*J. The first node 4 can generate or form M different garbled circuits $C_i$ for the function. M can be any value greater than 1, and can be, for example, 10000. In some embodiments, each of the garbled circuits is formed from the same circuit representing the function. Thus, the same circuit can be garbled M times. Alternatively, M different circuits representing the function can be formed, and each of these M circuits garbled to form the M garbled circuits. In another alternative, the M garbled circuits can be formed from P different circuits representing the function (where P<M and P>1).

After forming the first plurality of garbled circuits, the first node 4 publishes a list of the plurality of garbled circuits for the function (step 103). This list is referred to as a 'first list' herein. Thus, the first node 4 makes the list available to a plurality of second nodes 6 that may wish to evaluate the function. Therefore the first list is made available so that any second node 6 is able to request or obtain the first list from the first node 4. In publishing the first list, the first node 4 also makes the first plurality of garbled circuits available to the plurality of second nodes 6 (i.e. the garbled circuits themselves are also published). In embodiments where commitments are generated for the wire keys, the first node 4 also publishes the commitments for the wire keys. In embodiments where hashes of each of the wire keys are generated or digital signatures, the first node 4 also publishes the hashes or digital signatures with the first list.

Referring now to FIG. 3, a second node 6 can receive or obtain the first list of garbled circuits from the first node 4 (step 121). That is, the first node 4 has published the list, and the second node 6 obtains the list. The second node 6 may obtain the list as soon as it is published, when the second node 6 has input data to evaluate, or at some time point in between.

When the second node 6 has input data to evaluate using the function, the second node 6 selects one of the garbled circuits in the first list to use for evaluating the input data and obtains the selected garbled circuit from the first node 4 (step 125). The second node 6 preferably selects the garbled circuit at random from the first list (as otherwise the first node 4 might know which circuit to manipulate in advance). In some embodiments, the second node 6 selects just one of the garbled circuits for evaluation, but in other embodiments the second node 6 can select a plurality of the garbled circuits from the first list for evaluation.

In obtaining the selected garbled circuit from the first node 4, the second node 6 obtains the garbled tables for each of the logic operations in the selected garbled circuit, along with one or more wire keys for input data to be input by the second node 6. The one or more wire keys for the input data are obtained using an oblivious transfer (OT) procedure that enables the second node 6 to obtain the appropriate wire keys for its input data without learning both wire keys for any particular input wire, and without the first node 4 knowing which wire key has been provided to the second node 6 (so the first node 4 does not learn the input data of the second node 6). In embodiments where commitments have been generated for the wire keys and published with the first list, the second node 6 can also obtain the published commitments for the wire keys for the garbled circuit, and obtain the witnesses for the commitments for the obtained wire keys using oblivious transfer. In embodiments where hashes or digital signatures have been generated for the wire keys and published with the first list, the second node 6 can also obtained the published hashes or digital signatures for the wire keys for the garbled circuit.

Next, the second node 6 evaluates the obtained garbled circuit using the received wire keys for the input data of the second node 6 to determine the output of the function (step 127). Where commitments for the wire keys and corresponding witnesses have been obtained (or hashes or digital signatures, in those embodiments), the second node 6 can verify that the obtained wire keys and witnesses correspond to the respective wire key commitments.

The garbled circuit can be evaluated as follows. The second node 6 attempts to decrypt the rows in each garbled table using the received wire keys. The received wire keys will enable the second node 6 to decrypt one row per table (corresponding to the input values associated with those wire keys), and thus find an output value(s) for the garbled circuit. This output value is a wire key per output wire. Those skilled in the art will be aware of various techniques for decrypting the output of the garbled circuit. For example, in one technique, a convention is adopted that for output wires, the first bit of the wire key represents the bit value, i.e. the 0 wire is 0**** and the 1 wire is 1****.

Thus, the above techniques provide that since the garbled circuits are published to all second nodes 6, a particular second node 6 can be satisfied that the first node 4 has not manipulated the function specifically for that second node 6.

Since each garbled circuit should only be evaluated once (to maintain the secrecy of the underlying function), it is useful to provide a mechanism to enable the first node 4 to communicate which published garbled circuits (and thus which garbled circuits in the published list) have already been evaluated or are otherwise unavailable for evaluation by a particular client node 6.

Therefore, in some embodiments, the first node 4 can form a list indicating which one or ones of the first plurality of garbled circuits (as formed in step 101) have already been evaluated by a second node 6. This is shown as optional step 105 in FIG. 2. This list is referred to as a "second list" herein, and is denoted E. This second list can also be understood as a 'blacklist' of garbled circuits that can no longer be used, or that cannot be used by the second nodes 6.

The first node 4 then publishes this second list so that it can be accessed by the second nodes 6 (optional step 107).

Initially, i.e. when step 101 has just been performed, the second list is empty. However, as second nodes 6 evaluate published garbled circuits, the first node 4 updates the second list over time to indicate any garbled circuits that have been evaluated by the second node 6 and any other second nodes 6. This updated list is published by the first node 4 (for example whenever a garbled circuit is evaluated) so that second nodes 6 have up-to-date information on which garbled circuits are available.

Thus, returning to FIG. 3, the second node 6 can receive the second list from the first node 4 (step 123), and in step 125 the second node 6 can select and obtain the garbled circuit to evaluate based on the first list and the second list. That is, the second node 6 can select a garbled circuit to evaluate that is listed in the first list, but not listed in the second list. In other words, the garbled circuits in the second list are disregarded from the first list when selecting the garbled circuit to evaluate. In this way, the second node 6 will not be able to select any garbled circuit that the first node 4 has indicated as having been previously evaluated. In embodiments where the second node 6 randomly selects the garbled circuit, the second node 6 can randomly select the garbled circuit from the garbled circuits that are in the first list but not in the second list. If an updated second list is published by the first node 4, the second node 6 can obtain this updated second list and use that in any subsequent selection of a garbled circuit to evaluate.

In some embodiments, once a certain number N of published garbled circuits have been evaluated, the first node 4 may be required to generate or form further garbled circuits and publish a new list of garbled circuits that are available for evaluation by the second node 6. The first node 4 may be permitted to blacklist up to N circuits for a second node 6, but N must be much less than M (i.e. N<<M) to ensure that the first node 4 is not able to blacklist many 'good' garbled circuits to force (or increase the likelihood of) the second node 6 to select a 'bad' garbled circuit (i.e. a garbled circuit that the first node 4 has manipulated). The generation of additional garbled circuits is described in more detail below.

An exemplary implementation of the techniques described above is now presented. In steps 121 and 123 the second node 6 retrieves parameters M, N and list E from the first node 4. The second node 6 checks that |E|<N (i.e. the second node 6 checks that the threshold number of evaluations for the first node 4 to generate new garbled circuits has not been reached) and (if that check is passed) the second node 6 randomly selects a garbled circuit: $R \in \{1, \ldots, M\} \backslash E$ (step 125). The second node 6 retrieves the $R^{th}$ garbled circuit from the first node 4 (e.g. by the second node 6 sending an indication to the first node 4 indicating that the $R^{th}$ garbled circuit is to be evaluated), including the input wire commitments (step 125). For each input bit of the input data, the second node 6 and first node 4 engage in an OT protocol (for example as described in "The simplest protocol for oblivious transfer" by Chou et al., Cryptology ePrint Archive) so that the second node 6 obtains the appropriate wire keys, as well as the witnesses for the commitments to those wire keys. The second node 6 verifies that the obtained wire keys and witnesses correspond to the respective input wire commitments, and if so, the second node 6 evaluates the garbled circuit with the obtained wire keys and hence obtains the computation result (step 127). The first node 4 then updates the published second list E to include garbled circuit R.

As noted above, to increase the level of trust that the second node 6 has in the reliability of the published garbled circuits, the second node 6 may select and evaluate multiple garbled circuits from the published first list, and check that the evaluations produce the same result. An exemplary implementation of an embodiment in which multiple garbled circuits are obtained and evaluated is now presented. In steps 121 and 123 the second node 6 retrieves parameters M, N and list E from the first node 4. The second node 6 checks that |E|<N (i.e. the second node 6 checks that the threshold number of evaluations for the first node 4 to generate new garbled circuits has not been reached) and (if that check is passed) the second node 6 randomly selects n distinct garbled circuits: $R_1, \ldots, R_n \in \{1, \ldots, M\} \backslash E$, where n is any integer greater than 1 (step 125). The second node 6 retrieves the $R_1^{th}, \ldots, R_n^{th}$ garbled circuits from the first node 4 (e.g. by the second node 6 sending an indication to the first node 4 indicating that the $R_1^{th}, \ldots, R_n^{th}$ garbled circuits are to be evaluated), including the input wire commitments (step 125). For each input bit of the input data, the second node 6 and first node 4 engage in a single OT protocol so that the second node 6 obtains the appropriate wire keys for all of the obtained garbled circuits, as well as the witnesses for the commitments to those wire keys. The second node 6 verifies that, for all of the $R_1^{th}, \ldots, R_1^{th}$ garbled circuits, the obtained wire keys and witnesses correspond to the respective input wire commitments, and if so, the second node 6 evaluates the $R_1^{th}, \ldots, R_n^{th}$ garbled circuits with the obtained wire keys and hence obtains n computation results (step 127). If these computation results all match, then the second node 6 can accept the result as the outcome of the computation. If the results don't match, then the second node 6 can discard the results. The first node 4 then updates the published second list E to include garbled circuits $R_1, \ldots, R_n$. It will be appreciated that only a single OT protocol should be performed as otherwise the second node 6 can select different input data for the different garbled circuits and hence learn more information about the function than just the output of a single evaluation.

In some embodiments, a second node 6 can check that it is not being discriminated against by the first node 4 by ensuring that it has access to the same version of the first list of garbled circuits as the other second nodes 6. In some embodiments, a second node 6 can also check that it has access to the same version of the second list as the other second nodes 6. To facilitate this check or checks, the first node 4 can sign parameters M, N and the top node of a hash tree, in which each leaf node is the hash of a respective garbled circuit in the first plurality and the associated input commitments or hashes/digital signatures (if applicable). The signed parameters and signed top node can be published by the first node 4 so that it is accessible to the second nodes 6. When a second node 6 retrieves M, N and the garbled circuits from the first node 4 for function evaluation, the second node 6 can verify the correctness of these M, N values with respect to this signature using standard procedures for signature verification and hash tree integrity verification. In particular, the correctness of M, N can be verified using signature verification, and the correctness of the garbled circuits obtained by the second node 6 can be verified using hash tree integrity verification where the top hash is additionally verified against the signature. It should be noted that this requires the first node 4 to provide "authentication paths" for these circuits, i.e. the hashes of the siblings on the path from the leaf node representing the garbled circuit to the root.

Second nodes 6 can then ensure non-discrimination by checking that they are all using data based on the same signature. Those skilled in the art will be aware of various ways in which the first node 4 can publish the signature so that second nodes 6 can compare them, for example including publishing the signature on a third-party website; publishing the signature, encoded in a QR code, at an external location; publishing the signature, encoded in a QR code, on a website associated with the first node 4; or the first node 4 can publish the signature on a blockchain.

In some embodiments, a second node 6 can perform a check that the first node 4 has not modified the function over time or been dishonest with the garbled circuits in the first plurality by evaluating a (or another) garbled circuit using input data that produces a known (and verified) output from the function. This known output may have been obtained by the second node 6 during a previous evaluation, or it may be an output determined by a trusted third party that is made available to the second nodes 6 as a means to enable a check to be performed on the consistency of the garbled circuits. Where a known output is provided by a trusted third party, the known output may be kept secret from the first node 4 to prevent the first node 4 from adapting the circuit in order to produce the known output when the known input is presented. Alternatively, the known output may also be known (or potentially discoverable) by the first node 4, but there could be a bound on the size of the circuit to make it hard or impossible for the first node 4 to add circuitry that would produce the known output when the known input is presented. Thus, the second node 6 can therefore store input data and the corresponding output, and use these to verify the correctness of a garbled circuit obtained from the first node 4. Thus, the second node 6 can obtain a garbled circuit from the first node 4 and the wire keys for the stored input data as described above, and evaluate the obtained garbled circuit to determine an output. This output can be compared to the known output to determine if the underlying function has been modified or changed. If the outputs differ, then the second node 6 will know that the underlying function has been modified or changed. The second node 6 may perform this additional evaluation at the same time as the evaluation in step 127 above, in which case the second node 6 can discard the output determined in step 127 if the output of the additional evaluation does not match the known output, or it can be performed at a random time or at the discretion of the second node 6.

As noted above, the first node 4 may generate a new plurality of garbled circuits. For example the first node 4 may generate a new plurality of garbled circuits when a threshold number N of garbled circuits in the first plurality have been evaluated. Alternatively, the first node 4 may generate a new plurality of garbled circuits on expiry of a time period from when the first plurality of garbled circuits were formed. The time period may be any desired or suitable value (for example a day, a week, a month, etc.). Thus, the first node 4 may be arranged to form a second plurality of garbled circuits for the function, and publish a list of the second plurality of garbled circuits for access by the second nodes 6. This list is referred to as a "third list" herein. The garbled circuits in the second plurality can be formed in the same way as the garbled circuits in the first plurality, for example by being derived from the same circuit(s) as the garbled circuits in the first plurality, or from different or respectively different circuits representing the function.

In some embodiments, the second plurality of garbled circuits can include one or more new garbled circuits and one or more of the garbled circuits from the first plurality of garbled circuits that have not yet been evaluated. In this way, unused garbled circuits in the first list can be included in the second plurality and thus included in the third list.

Alternatively, the second plurality of garbled circuits can include a plurality of new garbled circuits, and the third list can be published in addition to the first list, so that a client node 6 is able to select a garbled circuit from one or both of the old list (the first list) and the new list (the third list). In this way the second node 6 is able to check that the first node 4 has not manipulated the function over time, as well as checking that the first node 4 has not modified the algorithm for that second node 6.

Thus, in some embodiments in step 125 the second node 6 selects and obtains at least one garbled circuit from the previous time interval (i.e. a garbled circuit from the first plurality as indicated in the first list) and at least one garbled circuit from the current time interval (i.e. a garbled circuit from the second plurality as indicated in the third list) and compares the results of the evaluations of the garbled circuit(s) from the previous time interval and of the garbled circuit(s) of the current time interval to check that they are the same. The time interval is chosen long enough so that many different second nodes 6 perform an evaluation in each time interval and hence check the correspondence in the computation results. Where the first node 4 has generated pluralities of garbled circuits for several different time intervals (e.g. more than two time intervals), it will be appreciated that the second node 6 could select one or more garbled circuits from more than two of these intervals for evaluation and comparison.

As an example, the first node 4 can select a fixed time interval (e.g., weekly) after which new garbled circuits are generated, and sets N such that there are enough garbled circuits to be evaluated in two times the time interval. M (the number of garbled circuits in the first plurality or second plurality) is chosen such that $N \ll M$, e.g., $M=10N$. At the end of each time interval, the first node 4 forms and publishes the new list (the third list) of garbled circuits, and keeps the previous list (the first list) available. In some embodiments, the first node 4 also publishes a fourth list that indicates which garbled circuits in the third list have already been evaluated and are therefore unavailable, with both the second list and fourth list being updated after an evaluation so that any re-use of garbled circuits between evaluations is avoided. In some embodiments, when evaluating garbled circuits in step 127, the second node 6 can evaluate a garbled circuit both from the current time interval and from the previous one as described above for the regular implementation, and the second node 6 only accepts the evaluation result if it is the same for both computations.

In some further embodiments, a trusted third-party auditor (e.g. trusted by the first node 4 and the second nodes 6) may be provided that performs spot checks to verify that the expected function is being executed by the second nodes 6. Specifically, the auditor can be told by the first node 4 exactly what function is being executed. Then, at random times, the auditor may request and obtain a garbled circuit from the first node 4, the auditor checks that the obtained garbled circuit corresponds to published information (e.g., on the blockchain or third-party website), and the auditor requests the first node 4 to show how the garbled circuit was constructed (for example by the first node 4 providing a seed for a pseudorandom number generator used for producing the wire keys for the garbled circuit). These spot checks by the auditor can further deter the first node 4 from cheating or changing the function for particular second nodes 4.

It is assumed above that the second node 6 obtains the output of the evaluation. In an alternative, it is possible for the first node 4 to obtain the output of the evaluation instead using standard techniques. In embodiments where the second node 6 evaluates only one garbled circuit, the first node 4 can, for instance, let the second node 6 evaluate $f'(x)=f(x)$ XOR r, where f(x) is the garbled circuit and r is a random bitstring that only the first node 4 knows. The second node 4 can determine f'(x) and provide it to the first node 4, and the first node 4 computes f(x) from it. Alternatively, the first node 4 might not tell the second node 6 how to translate output wire keys to output wire values, and the second node 6 can provide the output wire keys to the first node 4. In this case, for security, it is desirable that the first node 4 provides hashes of both output wire keys to the second node 6, without informing the second node 6 which is which, so that the second node 6 can compare the computed output wire key to the hashed values (after computing a hash of the output wire key).

In embodiments where the second node 6 evaluates multiple garbled circuits on the same input, the first node 4 can provide hashes of both output wire keys to the second node 6 for all garbled circuits to be evaluated, where for each output wire the 0 and 1 hashes are permuted randomly but consistently across garbled circuits. The second node 6 can evaluate all garbled circuits, hash all output wire keys, and for each output bit check whether it is consistent in the sense that either it is the first hash for all garbled circuits or it is the second hash for all garbled circuits.

It is also assumed above that the first node 4 does not have or provide a specific input to the evaluation (since that might enable the first node 4 to indirectly adapt the circuit to the second node 6). Any input of the side of the first node 4 that is independent from the second node 6 performing the evaluation can be seen as a "constant", i.e. it can be seen as being part of the algorithm/function.

In some implementations, as a further way to deter the first node 4 from providing different functions to different second nodes 6, or providing different functions to a second node 6 in different time intervals, techniques can be used to enable a second node 6 to prove that it has obtained an inconsistent evaluation result to third parties (including other second nodes 6). In one example, the first node 4 can publish signed hashes of the output wire keys for each of the garbled circuits; and during the evaluation the first node 4 confirms with a signature that the evaluations of the given garbled circuits are all part of the same circuit evaluation (if multiple garbled circuits are evaluated as described above). The second node 6 can compare the derived output wire keys to the published hashes, and if the second node 6 derives inconsistent output wire keys matching the published hashes, this convinces a third party that the server misbehaved. That is, when publishing the garbled circuit, the first node 4 can also publish hashes H(k0), H(k1) of the output wire keys k0 and k1 for each output wire. The second node 6 can determine the output of the garbled circuit, and after the evaluation the second node 6 has wire key ki for each output wire. The second node 6 computes H(ki) and checks whether it matches the hash of the first or second wire key. Additionally, this allows the second node 6 to prove to others that it correctly evaluated the function, as the only way for a second node 6 to learn a ki that hashes to the published values H(k0) or H(k1) is by correctly evaluating the garbled circuit.

So, assume that a second node 6 selects garbled circuits #N1, #N2, #N3 for evaluation. The first node 4 sends a signature of the statement "the second node 6 is going to execute circuits #N1, #N2, #N3" to the second node 6. Suppose the second node 6 gets different evaluation results from these circuits. Then the second node 6 can prove to an external party both that it executed circuits #N1, #N2, #N3 on the same input (because the first node 4 has confirmed this) and that the outcome was different (because it has pre-images for the different respective published hashes for the three circuits, i.e., "inconsistent output wire keys matching the published hashes"). While it is true that the first node 4 can provide incorrect hashes, these incorrect hashes would have been provided while publishing the garbled circuits, so this would have been irrespective of which second node 6 will use them.

There are therefore provided techniques for enabling a party that has a proprietary algorithm or function to keep the algorithm or function secret but to allow multiple other parties to execute the algorithm or function on their input data, while discouraging or preventing the party from manipulating the algorithm or function for a particular party (in the sense that the party cannot manipulate the algorithm or function without being detected, or having a high risk of being detected, by the other parties).

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first node for providing a function to a second node for evaluation, the first node being configured to perform the following operations, comprising:
    form, via the first node, a first plurality of garbled circuits for the function, each garbled circuit being formed from a circuit representing the function and a respective set of wire keys, the circuit comprising one or more logic operations, one or more input wires for inputting input data into the circuit and one or more output wires for outputting a result of the function, wherein each respective set of wire keys comprises a respective subset of wire keys for each input wire and each output wire, each subset of wire keys comprising a plurality of wire keys, each wire key in the plurality of wire keys being associated with a possible value for a respective wire;
    publish, via the first node, a first list of the first plurality of garbled circuits representing the function for access by a plurality of second nodes;
    receive, via the first node, a selection of a first garbled circuit from the first list by a leading second node of the plurality of second nodes;
    form, via the first node, a second list indicating which one or ones of the first plurality of garbled circuits for representing the function have been evaluated by one or more of plurality of second nodes in response to the determination of the selection of the first garbled circuit from the first list by the leading second node;
    publish, via the first node, the second list of the first plurality of garbled circuits representing the function for access by the plurality of second nodes; and
    receive, via the first node, a selection of a second garbled circuit based on the first list and the second list by a following second node of the plurality of second nodes.

2. A first node as claimed in claim 1, wherein the first node is further configured to:
    form a second list indicating which one or ones of the first plurality of garbled circuits for representing the function have been evaluated by one or more of the second nodes.

3. A first node as claimed in claim 2, wherein the first node is further configured to:
    update the second list indicating which one or ones of the first plurality of garbled circuits representing the function have been evaluated following an evaluation of one or more of the garbled circuits in the first plurality.

4. A first node as claimed in claim 1, wherein the first node is further configured to:
    send one or more wire keys from the respective set of wire keys for each of the one or more garbled circuits that are to be evaluated to the second node using oblivious transfer.

5. A first node as claimed in claim 1, wherein the first node is further configured to:
    form a second plurality of garbled circuits for the function, each garbled circuit being formed from a circuit and a respective set of wire keys, the circuit comprising one or more logic operations, one or more input wires for inputting input data into the circuit and one or more output wires for outputting the result of the function, wherein each respective set of wire keys comprises a respective subset of wire keys for each input wire and each output wire, each subset of wire keys comprising a plurality of wire keys, each wire key in the plurality being associated with a possible value for the respective wire; and
    publish a third list of the second plurality of garbled circuits representing the function for access by the plurality of second nodes.

6. A first node as claimed in claim 5, wherein the first node is configured to form the second plurality of garbled circuits if at least a threshold number of garbled circuits in the first plurality of garbled circuits have been evaluated.

7. A first node as claimed in claim 5, wherein the first node is configured to form the second plurality of garbled circuits on expiry of a time period from the forming of the first plurality of garbled circuits.

8. A first node as claimed in claim 5, wherein the first node is configured to include one or more of the garbled circuits from the first plurality of garbled circuits that have not been evaluated in the second plurality of garbled circuits.

9. A first node as claimed in claim 5, wherein the first node is configured to publish the third list of the second plurality of garbled circuits representing the function for access by the plurality of second nodes in addition to publishing the first list of the first plurality of garbled circuits for access by the plurality of second nodes.

10. A first node as claimed in claim 5, wherein the first node is further configured to publish a commitment, a cryptographic hash or a digital signature for each wire key for each input wire for access by the plurality of second nodes.

11. A first node as claimed in claim 1, wherein the first node is further configured to:
send one or both of an indication of the number of garbled circuits in the first plurality and an indication of a threshold number of garbled circuits in the first plurality that can be evaluated to at least one second node.

12. A first node as claimed in claim 1, wherein the first node is further configured to:
sign a top node of a hash tree, wherein each leaf node of the hash tree is a hash of a respective garbled circuit in the first plurality; and
publish the signed indication(s) and signed top node for access by the plurality of second nodes.

13. A first node as claimed in claim 1, wherein each garbled circuit is formed from a respective circuit representing the function.

14. A first node as claimed in claim 1, wherein each garbled circuit is formed from a first circuit representing the function.

15. A first node as claimed in claim 1, wherein two or more of the first plurality of garbled circuits are formed from a first circuit representing the function, and one or more other garbled circuits in the first plurality of garbled circuits is formed from a second circuit representing the function.

16. A following second node of a plurality of second nodes for evaluating a function using an input data of the following second node, the following second node being configured to perform the following operations, comprising:
receive, from a first node, a first list of a first plurality of garbled circuits for the function, wherein each garbled circuit is formed from a circuit comprising one or more logic operations representing the function and a respective set of wire keys, the circuit having one or more input wires for inputting a input data into the circuit and one or more output wires for outputting the result of the function, each respective set of wire keys comprising a respective subset of wire keys for each input wire and each output wire, each subset of wire keys comprising a plurality of wire keys, each wire key in the plurality being associated with a possible value for the respective wire;
receive, from the first node, a second list indicating which one or ones of the first plurality of garbled circuits representing the function have been evaluated by a leading second node of the plurality of second nodes;
obtain, from the first node, one or more of the garbled circuits that are in the first list but not in the received second list; and
evaluate the obtained one or more garbled circuits using the input data of the following second node to determine the output of the function.

17. The following second node as claimed in claim 16, wherein the second node is further configured to:
receive an updated second list indicating which one or ones of the first plurality of garbled circuits representing the function have been evaluated following an evaluation of one or more of the garbled circuits in the first plurality.

18. The following second node as claimed in claim 16, wherein the second node is further configured to:
randomly select the one or more of the garbled circuits for evaluation.

19. The following second node as claimed in claim 16, wherein the second node is further configured to:
send an indication of one or more garbled circuits that are to be evaluated by the second node to the first node; and
receive one or more wire keys from the respective set of wire keys for each of the one or more garbled circuits that are to be evaluated from the first node using oblivious transfer.

20. A method of operating a following second node of a plurality of second nodes to evaluate a function using an input data of the following second node, the method comprising:
receiving, from a first node, a first list of a first plurality of garbled circuits for the function, wherein each garbled circuit is formed from a circuit comprising one or more logic operations representing the function and a respective set of wire keys, the circuit having one or more input wires for inputting a input data into the circuit and one or more output wires for outputting the result of the function, each respective set of wire keys comprising a respective subset of wire keys for each input wire and each output wire, each subset of wire keys comprising a plurality of wire keys, each wire key in the plurality being associated with a possible value for the respective wire;
receiving, from the first node, a second list indicating which one or ones of the first plurality of garbled circuits representing the function have been evaluated by a leading second node of the plurality of second nodes;
obtaining, from the first node, one or more of the garbled circuits that are in the first list but not in the received second list by the leading second node of the plurality of second nodes; and
evaluating the obtained one or more garbled circuits using the input data of the following second node to determine the output of the function.

21. A method as claimed in claim 20, wherein the method further comprises:
receiving an updated second list indicating which one or ones of the first plurality of garbled circuits representing the function have been evaluated following an evaluation of one or more of the garbled circuits in the first plurality.

* * * * *